This invention relates to surface layers intended for example as protective outer layers and is particularly though not exclusively applicable to such protective outer layers as may be applied to parts of aircraft exposed to the atmosphere.

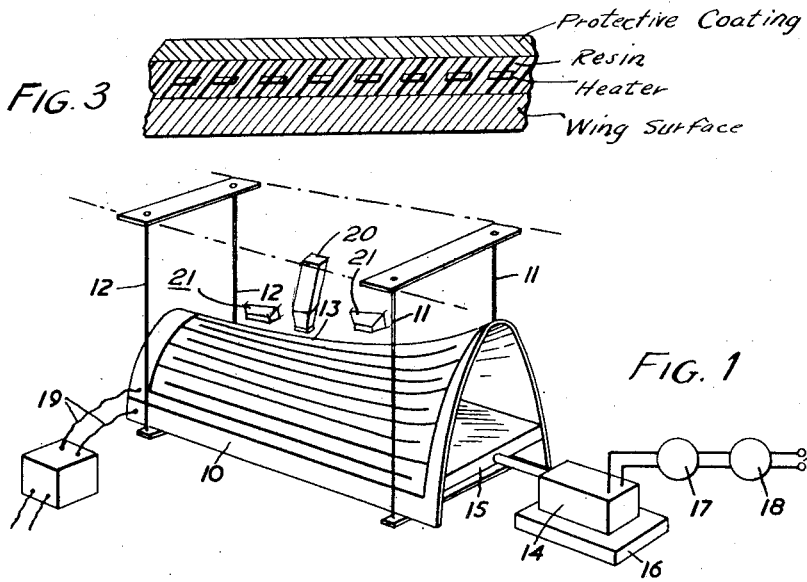
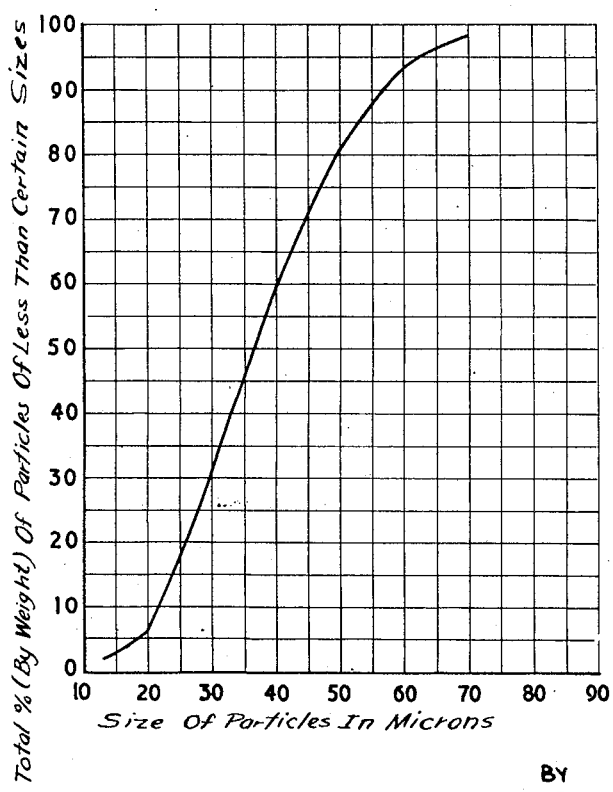
INVENTORS
JACK CURRANT
JOHN J. R. GENT
DONALD N. HUNTER
BY
Watson, Cole, Grindle & Watson
ATTORNEY 3,038,822
SURFACE LAYERS AND METHODS OF APPLYING VISCOUS FLUIDS TO SURFACES
Jack Currant, John Joseph Robert Gent, and Donald Noel Hunter, London, England, assignors to D. Napier & Son Limited, London, England, a company of Great Britain
Filed Oct. 8, 1958, Ser. No. 766,029
Claims priority, application Great Britain Oct. 11, 1957
13 Claims. (Cl. 117—217)

It is an object of the invention to provide an improved surface layer which will be highly resistant to erosion or to damage by rain droplets, ice particles or other small particles such as stones or sand.

A protective outer layer according to the present invention comprises a synthetic resin intermixed with a metal powder. The proportion of metal powder may with advantage be 80% or 85% by weight, or even higher. The powder particle size is preferably carefully selected, and extremely small. Thus powder of 200 mesh or 300 mesh (70 microns) has been found to give good results. Preferably the particle size is distributed between approximately 10 microns and 70 microns.

Preferably the metal powder comprises stainless steel particles though other comparatively hard metal particles may be employed. The hardness of the metal material is preferably at least 150 V.P.N. and may with advantage be 300–350 V.P.N., or even as high as 840 V.P.N. (These values being equivalent respectively to 80 Rockwell "B," 30–35 Rockwell "C," and 62 Rockwell "C.")

The synthetic resin is preferably a thermo-setting or cold curing resin such as an epoxy resin.

The outer protective layer accordinig to the present invention is particularly useful when applied as a protection to and over an electrical surface heating element. Thus the invention is particularly adapted to be used in conjunction with a heating element as described and claimed in United States Patent No. 2,791,668. The present invention has great advantages in that it enables a protective layer to be applied to articles of compound curvature, and can readily be applied to large or small articles.

The protective outer layer according to the invention is preferably applied in fluid form, the resin being a liquid initially, but when the percentage of the metal powder in the resin is 80% or more by weight the resultant mixture will have a very high viscosity which creates difficulties in applying and spreading the fluid over the surface.

According to another aspect of the invention therefore in a method of applying and spreading a viscous fluid mixture of a resin and metal powder over a surface, the fluid mixture is applied to an upper part of the surface and the surface is vibrated.

Preferably the surface is vibrated in a horizontal direction while the fluid is allowed to descend slowly under the effects of gravity. In some cases however, it may be more convenient to vibrate the surface vertically or to cause oscillations about an axis. Preferably the vibrations will be arranged in a direction parallel to the plane of the surface.

According to a preferred feature of the invention heat is applied to the fluid and/or the surface during the vibration. The vibrations are preferably imparted at a frequency of at least 20 and conveniently at least 50 cycles per second. The flow of fluid over the surface may be assisted or controlled by directing a stream of gas against the fluid, and the gas stream may be warmed to further assist the flow.

The invention may be performed in various different ways but one specific embodiment will now be described by way of example with reference to the accompanying drawings in which FIGURE 1 is a diagrammatic perspective view of apparatus for applying a coating, FIGURE 2 is a graph showing the particle size composition of the metal powder, and FIGURE 3 is a sectional elevational view in fragment of the article to be coated.

In this example the invention is applied to the provision of an outer protective surface layer covering an electrical surface heating element on the leading edge of an aircraft wing section 10. The surface heating element itself comprises a zig-zag pattern of a thin layer of aluminium alloy sandwiched between inner and outer insulating layers each formed of an epoxy resin adhesive such as a resin prepared by the reaction of epichlorohydrin and Bisphenol A (4,4' dihydroxydiphenylpropane). Particular forms of such heating elements are described and claimed in United States of America Patent No. 2,791,668.

In performing the present invention the outer insulating layer of the heater element is rubbed down with abrasive or sand blasted to provide a slight roughness and the complete wing is suspended on tension wires 11, 12 or mounted on flexible supports such as rubber cushions with the leading edge 13 of the wing uppermost and approximately horizontal.

An electrical vibrating device 14 is then attached to the wing at 15 with the body of the device connected to a stationary anchor 16 or to a heavy inertia mass. The device itself is conveniently in the form of a solenoid which when connected to an electrical supply will provide vibrations of the complete wing at a selected frequency and amplitude. The device 14 is connected to a frequency controller 17 and an amplitude controller 18 which enable the frequency to amplitude to be varied as required. In practice a frequency between 40 and 60 cycles per second is effective, though the frequency may be increased as high as 400 c./s. in some cases. The actual frequency will depend upon the article being treated, and will be adjusted to turn out unwanted natural vibrations. The amplitude may be between 2 and 10 thousandths of an inch. The position of the vibrating device 14 is such that the vibrations imparted to the wing will be in a horizontal direction parallel to the leading edge, and generally parallel to the parts of the wing surface on either side thereof. A gun 20 is used to apply the coating and the heated air is provided by air jets 21.

FIGURE 2 is a graph showing the proportion of the particles which are less than the specified diameters. In FIGURE 2, the abscissa relates to the size of particles in microns and the ordinate relates to the total percentage (by weight) of particles of less than a certain size.

FIGURE 3 provides a cross section of the plane wing to be coated having suitable, self-explanatory legends.

A mixture is prepared of the material which is to form the outer protective layer. In one example this mixture comprises 80% by weight of a 300 mesh (300 apertures per linear inch) silicon stainless steel powder (particle size below 70 microns), the particles being generally spherical, and 20% of the liquid epoxy resin prepared by the reaction of epichlorohydrin and Bisphenol A (4,4' dihydroxydiphenylpropane) under alkaline conditions and having an epoxide value of 5.0 equivalents per kilogramme. The proportions of metal powder may be increased with advantage up to 90% or even 93% by weight. The steel composition is 18% chromium, 8% nickel, 2% silicon, remainder iron. The hardness thereof is approximately 250 V.P.N. (equivalent to 22 Rockwell "C").

In another example the metal powder consists of an alloy containing 10–20% chromium, 2–3.5% boron, 2–3.5% silicon, up to 5% of other alloying elements such as iron, the remainder being nickel. This alloy has a hardness of between 35–62 Rockwell "C." The particle size of the powder is preferably as shown in the graph of FIGURE 2, from which it will be seen that approximately the whole of powder has a particle size between 10 and 70 microns, and a size distribution which is spread substantially evenly over the size range.

In the preparation of the mixture the liquid resin is heated to 100° C. and is agitated in a container with a submerged perforated paddle connected to an electrical vibrator giving vibrations of 25–50 thousandths of an inch at 50 c./s. The metal powder is preheated to 100 to 120° C. and is then added to the resin, which is agitated continuously and during the subsequent cooling down to less than 30° C. A hardener for the synthetic resin which is for example diethylamino-propylamine is then added in liquid form and mixed by hand. The complete mixture is then agitated for a further ten minutes to disperse any air entrapped.

The resultant mixture is a fluid of very high viscosity which would normally be difficult to apply and spread at any controlled thickness over a surface. In accordance with the present invention the mixture is extruded through an extrusion gun along the uppermost part of the leading edge 13 of the wing and the vibrator 14 is energised to cause the wing to vibrate horizontally and in the general plane of the wing surface. The wing itself is heated by supplying heater current to the electrical surface heating element on the wing surface via flexible heater cables 19, and radiant heating may also be directed onto the external surfaces of the wing by electrical heat radiators positioned externally. In addition streams of warm air may be directed on to the viscous mixture by electrical warm air blowers. Under the influence of the vibrations and of the heat applied the viscous mixture will tend to spread and flow down both sides of the leading edge. A preferred thickness of the layer is .015 inch.

The area to be covered by the viscous mixture has previously been marked off with tape and when the lower edge of the mixture has moved on to the masking tape the vibrating device is shut off and also the supply of heat.

Within a short period of time the resin constituent of the mixture will have solidified and will be in the state known as the "B" condition, when it is solid but not fully cured. The masking tape is then removed and the edges of the applied layer are cut straight and faired in at a chamfer angle by applying a fillet of the mixture.

In some cases it is convenient to apply the mixture on a series of separate areas spaced by a small distance from one another and when this is done the gaps between the areas are now filled in with the same viscous metal-resin mixture using the same vibration and heating technique.

The whole applied surface layer is then fully cured by application of heat for the required time, usually by means of external radiators.

The surface of the curved layer is then subjected to an abrasive air blast to remove any small protuberances of resin which may have risen to the surface. If desired the surface can then be painted.

The resultant protective outer layer can thus be readily applied to surfaces of compound curvature and possesses remarkable properties of resistance to damage by small stones or similar particles. The vibration applied to the wing while the viscous mixture is spreading tends to eliminate any small air pockets which might otherwise form, and which would reduce the protective strength of the layer.

What we claim as our invention and desire to secure by Letters Patent is:

1. An electrical surface heater element comprising a thin conducting layer sandwiched between inner and outer insulating layers, the outer insulating layer being formed of a synthetic resin, and a protective outer layer overlying and adhering to the outer insulating layer, the protective layer comprising a synthetic resin intermixed with a metal powder.

2. A surface heater element as claimed in claim 1 in which the proportion of metal powder in the resin-powder mixture is at least 80% by weight.

3. A surface heater element as claimed in claim 1 in which the proportion of metal powder is at least 85% by weight.

4. A surface heater element as claimed in claim 1 in which the proportion of metal powder is approximately 90% by weight.

5. A surface heater element as claimed in claim 1 in which substantially the whole of the powder will pass through a screen having a mesh size of 300 apertures to the linear inch.

6. A surface heater element as claimed in claim 1 in which substantially the whole of the powder has a particle size within the limits of 10 and 70 microns.

7. A surface heater element as claimed in claim 1 in which the metal powder particles are approximately spherical in shape.

8. A surface heater element as claimed in claim 1 in which the metallic material of which the powder is comprised has a hardness greater than 80 Rockwell "B."

9. A surface heater element as claimed in claim 1 in which the metal powder has a hardness greater than 30 Rockwell "C."

10. A surface heater element as claimed in claim 1 in which the metal of which the powder consists is non-oxidizing on exposure to the atmosphere.

11. A surface heater element as claimed in claim 1 in which the metal powder consists of stainless steel.

12. A surface heater element as claimed in claim 1 in which the synthetic resin comprises an epoxy resin.

13. A surface heater element as claimed in claim 1 in which substantially the whole of the powder will pass through a screen having a mesh size of 200 apertures to the linear inch.

References Cited in the file of this patent

UNITED STATES PATENTS

| | | |
|---|---|---|
| 2,105,552 | Ruben | Jan. 18, 1938 |
| 2,730,597 | Podolsky | Jan. 10, 1956 |
| 2,748,746 | Wommelsdorf | June 5, 1956 |
| 2,791,515 | Nack | May 7, 1957 |
| 2,799,764 | Chandler | July 16, 1957 |
| 2,843,711 | Crick | July 15, 1958 |

FOREIGN PATENTS

| | | |
|---|---|---|
| 475,914 | Italy | Nov. 22, 1952 |
| 886,576 | Germany | Aug. 17, 1953 |